(12) United States Patent
Nayak et al.

(10) Patent No.: US 10,906,572 B2
(45) Date of Patent: Feb. 2, 2021

(54) METHOD FOR THE DETECTION OF CROSSTALK PHENOMENA

(71) Applicant: SIEMENS MOBILITY GMBH, Munich (DE)

(72) Inventors: Bhabani Nayak, Braunschweig (DE); Karsten Rahn, Cremlingen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 16/471,253

(22) PCT Filed: Nov. 20, 2017

(86) PCT No.: PCT/EP2017/079727
§ 371 (c)(1),
(2) Date: Jun. 19, 2019

(87) PCT Pub. No.: WO2018/114167
PCT Pub. Date: Jun. 28, 2018

(65) Prior Publication Data
US 2020/0114943 A1 Apr. 16, 2020

(30) Foreign Application Priority Data
Dec. 19, 2016 (EP) ...................................... 16205081

(51) Int. Cl.
*B61L 27/00* (2006.01)
*H04B 3/487* (2015.01)
*B61L 25/02* (2006.01)

(52) U.S. Cl.
CPC ......... *B61L 27/0055* (2013.01); *B61L 25/025* (2013.01); *B61L 27/0005* (2013.01); *H04B 3/487* (2015.01)

(58) Field of Classification Search
CPC ............... B61L 27/0055; B61L 25/025; B61L 27/0005; H04B 3/487
(Continued)

(56) References Cited

U.S. PATENT DOCUMENTS 5,311,440 A * 5/1994 Hess, Jr. ................ G01R 29/10
324/612
5,419,631 A * 5/1995 Slater ........................ G01S 3/48
356/508

(Continued)

FOREIGN PATENT DOCUMENTS

EP 2985629 A1 2/2016
WO 2015055391 A2 4/2015

*Primary Examiner* — Tung X Nguyen
*Assistant Examiner* — Robert P Alejnikov, Jr.
(74) *Attorney, Agent, or Firm* — Laurence Greenberg; Werner Stemer; Ralph Locher (57) ABSTRACT

A method for the detection of a crosstalk phenomenon in the communication between a wayside transmission unit, especially a balise, and an on-board unit including an antenna unit, of a railway vehicle, includes the steps of receiving an excitation signal of the wayside transmission unit by using the antenna unit in a moving state of the railway vehicle and measuring an electric and/or a magnetic field in a near field of the wayside transmission unit by using the antenna unit upon reception of the excitation signal. A near field to far field transformation on the field measured in the measuring step is performed to detect a presence of a crosstalk phenomenon. A corresponding an on-board unit is also provided.

15 Claims, 4 Drawing Sheets

(58) Field of Classification Search
USPC .................. 324/628, 612, 615, 617, 619–621
See application file for complete search history.

(56) References Cited

U.S. PATENT DOCUMENTS

| | | | |
|---|---|---|---|
| 10,577,001 B2* | 3/2020 | Freise | ........................ B61L 1/08 |
| 2010/0141454 A1* | 6/2010 | Bantin | ................ G01S 13/4454 |
| | | | 340/572.7 |
| 2011/0009745 A1* | 1/2011 | Seifer | ....................... G01F 1/74 |
| | | | 600/437 |
| 2015/0260835 A1* | 9/2015 | Widmer | ................ H02J 7/0027 |
| | | | 342/27 |
| 2020/0158768 A1* | 5/2020 | Derat | ................... G01R 29/105 |

* cited by examiner

METHOD FOR THE DETECTION OF CROSSTALK PHENOMENA

BACKGROUND OF THE INVENTION

Field of the Invention

The present invention relates to a method for the detection of a crosstalk phenomenon in the communication between a wayside transmission unit, WTU, especially a balise, and an On-board Equipment, OBU, of a railway vehicle, wherein the OBU comprises an antenna unit. The method comprises the steps of receiving an excitation signal of the WTU via the antenna unit in a moving state of the railway vehicle. Measuring an electric and/or a magnetic field in a near field of the WTU via the antenna unit upon reception of the excitation signal.

Technological Background

The determination of the exact position of a moving railway vehicle like a train in the state of the art among others is performed via so called wayside transmission units, WTUs, which are arranged in the environment of the railway vehicle. A typical example for such a wayside transmission unit, WTU, is a so called balise. A balise, as for example a so called Eurobalise, is an electronic beacon or transponder placed between the rails of a railway as part of an automatic train protection (ATP) system. For a communication with the balise, the railway vehicle comprises a so called On-board Unit, OBU, which comprises an antenna unit, the OBU being adapted to detect a WTU and to exchange data, e.g. position data with the WTU, for example with a balise, when the railway vehicle passes, e.g. rides over the balise.

However, the exact vital localization of a railway vehicle like a train via a WTU is error-prone due to the presence of crosstalk phenomena between several line side equipments, especially in cases where transponders as the aforementioned Eurobalises are installed in environments together with communication loop devices, S-bonds and the like. A crosstalk phenomenon is any phenomenon by which a signal transmitted on one circuit or channel of a transmission system as a transponder creates an undesired effect in another circuit or channel. Crosstalk is usually caused by undesired capacitive, inductive, or conductive coupling from one circuit, part of a circuit, or channel, to another.

Figure 1:
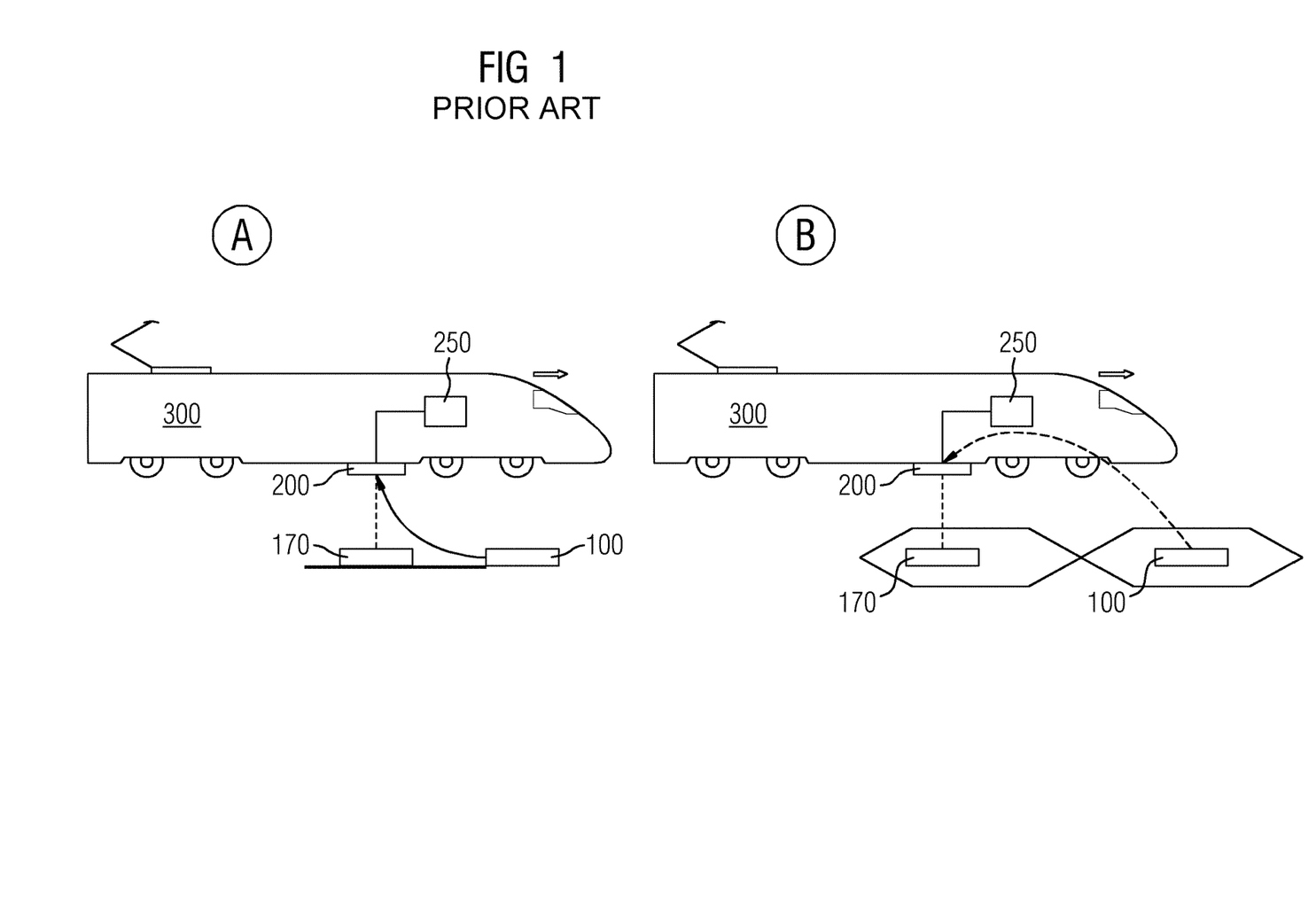
FIG. 1 illustrates two different crosstalk phenomena.

Due to the aforementioned crosstalk phenomena, the detection of a transponder can be shifted by certain distance which is illustrated in FIG. 1. Expressed in other words, FIG. 1 illustrates a deviation of the actual position of a transponder from the position that is erroneously detected as the position of the same transponder, due to the presence of a crosstalk phenomenon.

In FIG. 1, two different crosstalk phenomena are illustrated. In the scenarios denoted A and B, shown on the left and right side of FIG. 1, a railway vehicle 300 realized as a train passes a wayside transmission unit, WTU 100, that is realized as a balise. The driving direction of the railway vehicles 300 shown in FIG. 1 is indicated via an arrow respectively. The railway vehicles 300 comprise an On-board Unit, OBU 250, which comprises an antenna unit 200 and which is adapted to detect the position of the WTU 100 upon the reception of an excitation signal. In both scenarios A and B, an inaccurate position 170 of the balise is detected by the OBU 250. Expressed in other words, the detected position of the transponder within the WTU 100/balise is shifted by a distance and deviates from the actual position of the WTU 100/balise between the rails.

In addition, a crosstalk phenomenon may arise due to the presence of a wayside transmission unit, WTU, such as Balises, S bonds and Communication loops in a neighboring track. In such a scenario, the antenna unit of the OBU receives the excitation signal from the neighboring track which can lead to a false localization of a train.

In scenario A shown on the left side of FIG. 1, the aforementioned inaccurate detection is due to a crosstalk phenomenon that is due to the use of linear lines. In scenario B shown on the right side of FIG. 1, the aforementioned inaccurate detection is due to a crosstalk phenomenon that is due to so called communication loops. Crosstalk phenomena as the aforementioned significantly complicate the vital localization of a railway vehicle 300 as a train. The safety case of an automatic train protection (ATP) system has to consider the aforementioned possible shift in the determination of the position due to crosstalk, which will decrease the vital detection accuracy of the transponder of a WTU 100. However, it is difficult to define generic limits to exclude crosstalk at a certain level.

In the state of the art, the crosstalk phenomenon problem described hereinbefore is addressed and counteracted by the stipulation of restrictive rules and conditions for the installation of transponders in the field and for the installation of WTU-readers and especially of balise-readers on board of railway vehicles. However, these installation rules and conditions are very complicated, can require a high degree of engineering effort during a certain project and cannot prevent a misuse or distortion e.g. by a transponder accidentally or maliciously installed under violation of the aforementioned rules.

SUMMARY OF THE INVENTION

It is thus an object of the invention to provide for a method that allows for the detection of a crosstalk phenomenon in the communication between a wayside transmission unit, WTU, especially a balise, and an On-board Unit, OBU, of a railway vehicle.

According to the invention, it is provided a method for the detection of a crosstalk phenomenon in the communication between a wayside transmission unit, WTU, especially a balise, and an On-board Unit, OBU, of a railway vehicle, wherein the OBU comprises an antenna unit. The method comprises the steps of: Receiving an excitation signal of the WTU via the antenna unit in a moving state of the railway vehicle. Measuring an electric and/or a magnetic field in a near field of the WTU via the antenna unit upon reception of the excitation signal. According to the invention, the method comprises the step of performing a near field to far field transformation, NF2FFT, on the field measured in the step of measuring to detect a presence of a crosstalk phenomenon.

An advantage of such a method is that it reliably allows to detect and to identify a crosstalk phenomenon by performing a near field to far field transformation, NF2FFT, on the field measured in the step of measuring. The NF2FFT is carried out to determine at least one far field parameter of the measured electric and/or magnetic field that is measured in the near field of the WTU and transformed to a far field. In case of the presence of a crosstalk phenomenon in the communication between the WTU and the OBU, the far field parameters determined unambiguously differ from known transponder characteristics. By considering the calculated parameter it can be safely decided if the transponder transmission of a WTU was caused by crosstalk or not and the transponder information of the WTU can be vitally suppressed in case of a crosstalk situation/in case of the presence of a crosstalk phenomenon. This means the described procedure offers a common technical solution which allows to detect a crosstalk situation or phenomenon by using a NF2FF transformation and by correlating the transform with known transponder characteristics. In more detail, the method according to the invention allows to minimize the vital detection inaccuracy of a transponder which is due to physical parameters during a detection process. Moreover, safety margins as defined by the aforementioned restrictive rules and conditions for the installation of transponders, WTU-readers and balise-readers, which are provisioned to account for crosstalk assumptions, can be omitted, because a crosstalk phenomenon or situation can be detected. In general, the performance of a transponder detection is optimized. Moreover, the aforementioned crosstalk detection allows for a simplification of the aforementioned installation rules for transponders and WTUs which makes it possible to minimize the installation and engineering effort during customer projects. In fact, as a technical procedure for crosstalk detection is provided, the installation of WTUs/transponders inside existing environments can also be performed because crosstalk phenomena/situations can be handled online. Thus, the installation of such WTUs/transponders does not need to be compliant with specific safety rules or fulfill specific engineering conditions. Moreover, the method according to the invention is not limited to specific transponders, for example to Eurobalises or railway applications, in principle the procedure is applicable for all kinds of transponder detection. Furthermore, the method allows for the detection of crosstalk phenomena arising from a WTU that is positioned on the same track that a railway vehicle is riding on as well as from a WTU that is positioned on a neighboring track of the moving railway vehicle.

Preferably, the method comprises the step of performing a near field to far field transformation, NF2FFT, on the field measured in the step of measuring to allow for the detection of the presence of a crosstalk phenomenon.

Preferably, the method further comprises the step of transmitting data between the WTU and the OBU. Expressed in other words, the method preferably further comprises the step of reading out the WTU via the OBU.

In a preferred embodiment, the On-board unit comprises at least one probe connected to the antenna unit, wherein in the step of measuring, the near field of the WTU is measured in real time, using the at least one probe for at least one predefined interval T. Especially in such an embodiment, the method can be provided as an online detection method or algorithm, allowing for an online or real time detection of a crosstalk phenomenon or situation during a transponder reading procedure or during a WTU reading procedure. In such an embodiment, the method according to the invention is performed in real time during the predefined interval T that can also be denoted "contact length interval" or "contact length window". In such an embodiment, the method provides for results in parallel to transponder/WTU reading in order to decide if transponder/WTU information can be used or not. Preferably, the at least one probe is electrically connected to the antenna unit.

Preferably, the at least one predefined interval T is calculated according to the formula $T=(3*L_{WTU})/(v_{rv,max})$ wherein $L_{WTU}$ is the geometrical length of the WTU and wherein $v_{rv,max}$ is the maximum speed limit allowed for the railway vehicle. In such an embodiment, an electric and/or magnetic field can be measured in intervals. By setting the intervals in which a measurement is performed to the predefined interval T, so to the contact length interval, the method allows for the measurement of so called closed loop waveguide patterns of the electric and/or magnetic field when the railway vehicle is positioned directly on the transponder or WTU. When such closed loop waveguide patterns are transformed to a far field, the result will be a NF2FFT curve with specific characteristics as among others a narrow beam width. In contrary, when the railway vehicle is not positioned directly on the transponder or WTU, the electric and/or magnetic field measured within the predefined interval T will have an open loop waveguide pattern. If a NF2FFT is performed on the electric and/or magnetic field with such an open loop waveguide pattern, the resulting NF2FFT curve will have other characteristics, as for example a broader beam width. Thus, via the length of the predefined interval T, the method can be matched and adjusted to a corresponding transponder/WTU the OBU desires to communicate with.

In a preferred embodiment, in the step of measuring, the electric and/or a magnetic field in the near field of the WTU is measured throughout the predefined interval T. In such an embodiment, the method can be performed in a more precise manner.

Preferably, the at least one probe is adapted to measure the near field with a frequency of 3 MHz, 4 MHz, 4.1 MHz, 4.2 MHz, 4.3 MHz, 4.4 MHz, 4.5 MHz, 4.6 MHz, 4.7 MHz, 4.8 MHz, 4.9 MHz or 5 MHz.

Preferably, the method further comprises the step of evaluating a pattern of a near field to far field transformation, NF2FFT curve received as a result in the step of performing. Such an evaluation allows for the precise detection of the position of the transponder/WTU relative to the OBU. Moreover preferred, the method further comprises the step of evaluating a pattern of a near field to far field transformation, NF2FFT curve.

In a preferred embodiment, in the step of evaluating, at least one parameter of the NF2FFT curve is determined, the at least one parameter being chosen out of a group of parameters comprising: the beam width of the NF2FFT curve, the polarization of the NF2FFT curve, the directivity of the NF2FFT curve and the gain of the NF2FFT curve. These parameters can easily be compared with each other, thus allowing for a reliable detection of the presence of a crosstalk phenomenon.

Furthermore preferred, it is also possible to determine the farfield pattern or the pattern of a near field to far field transformation using the NF2FFT based on a reference frequency of any WTU. In a preferred embodiment, the reference frequency is equal to 1 Mhz, to 2 Mhz, to 3 Mhz, to 4 Mhz or to 5 Mhz.

Preferably, the step of evaluating further comprises the sub-step of comparing the at least one determined parameter of the NF2FFT curve to a corresponding reference parameter of a reference NF2FFT curve of a reference WTU. Especially in such an embodiment, the method according to the invention is not based on the detection of absolute signal levels, which makes the method robust for implementation and useful especially for vital applications. In such an embodiment, the received NF2FFT curve can easily be correlated with known transponder characteristics.

In a preferred embodiment, the method further comprises the step of outputting an indication signal indicating the presence of a crosstalk phenomenon within the communication between the WTU and the OBU as soon as the absolute value of a difference between the at least one determined parameter of the NF2FFT curve and the corresponding reference parameter of the reference NF2FFT curve of the reference WTU exceeds a predefined value. Such an indication signal can easily be used to correct the detection performed, thus allowing for a correct detection of the position of a WTU, for example of a balise and for an undistorted communication between the WTU and OBU.

Preferably, the On-board unit further comprises a n×m field-programmable gate array, FPGA, that is connected to the at least one probe and which allows for the measurement of n×m near field samples within the step of measuring. In such an embodiment, a precise multidimensional measurement of electric and/or magnetic fields can be carried out which allows for a precise determination of the position of the WTU.

In a preferred embodiment, within the step of performing, the far field is calculated according to the following equation:

$$A(k_x, k_y) = \frac{1}{n}\sum_{i=1}^{n}\sum_{k=1}^{m}E_{i,k}(x, y, 0)e^{-jk_x x_i}e^{-jk_y y_k},$$

wherein A is the vector amplitude of the electric field E, $k_x$ is the propagation constant of the electric field E along a x-direction and wherein $k_y$ is the propagation constant of the electric field E along a y-direction. In such an embodiment, it is possible to derive all far field parameters needed for the step of comparing or for the mentioned correlation from the aforementioned equation. Such derivable parameters among others can be the directivity of the NF2FFT curve, the beam width of the NF2FFT curve, the polarization of the NF2FFT curve and/or the gain of the NF2FFT curve.

Furthermore, an On-board Unit, OBU, of a railway vehicle comprising an antenna unit is presented. According to invention, the OBU is adapted to perform a method that is according to the invention. With such an embodiment, the precise detection of transponders and WTUs is easily possible.

In a preferred embodiment, the OBU further comprises a n×m-field-programmable gate array, FPGA. In such an embodiment, a precise multidimensional measurement of electric and/or magnetic fields can be carried out which allows for a precise determination of the position of a WTU or of a transponder.

Furthermore preferred, the On-board unit further comprises one probe that is electrically connected to the n×m-field-programmable gate array, FPGA, wherein the OBU is adapted to measure an electric and/or a magnetic field in a near field of the WTU in a linear dimension via the FPGA and the probe. In such an embodiment, electric and/or magnet fields can be advantageously measured in a linear dimension.

Preferably, the On-board unit further comprises at least two probes that are electrically connected to the n×m-field-programmable gate array, FPGA, wherein the OBU is adapted to measure an electric and/or a magnetic field in a near field of the WTU in a two dimensional array via the FPGA and the at least two probes. In such an embodiment, the probes together with the FPGA can provide for a plain rectangular scan surface which allows to obtain a measurement of electric and/or magnet fields in a two dimensional array.

In a preferred embodiment, the at least two probes are arranged along a direction that is perpendicular to a driving direction of the railway vehicle. In such an embodiment, samples of the electric and/or magnetic field can efficiently be measured.

Preferably, the On-board unit further comprises a processing unit, adapted to perform the step of performing a near field to far field transformation, NF2FFT, on the electric or magnetic field measured with the at least one probe in order to detect a presence of a crosstalk phenomenon. Preferably, the processing unit comprises an On-board computing device, an On-board computer, a digital signal processor, DSP and/or a microcontroller. Furthermore preferred, the processing unit is further adapted to perform the step of evaluating and/or the step of outputting an indication signal as described hereinbefore.

Further aspects of the present invention could be learned from the dependent claims or the following description.

BRIEF DESCRIPTION OF THE SEVERAL VIEWS OF THE DRAWING

Features will become apparent to those of ordinary skill in the art by describing in detail exemplary embodiments with reference to the attached drawings in which.

DESCRIPTION OF THE INVENTION

Figure 2:
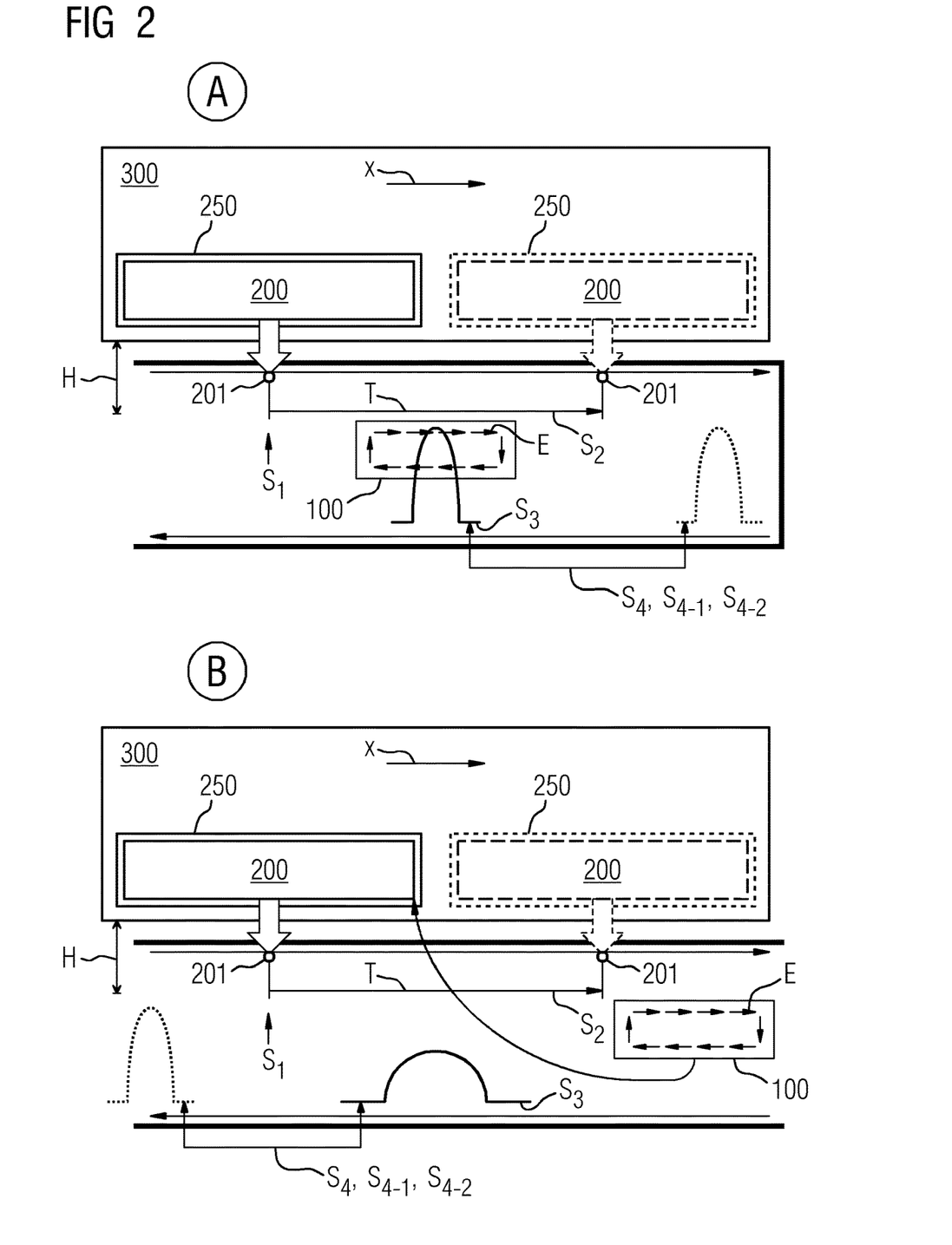
FIG. 2 illustrates an embodiment of a method according to the invention.

In FIG. 2, it is illustrated an embodiment of a method according to the invention. In more detail, FIG. 2 shows two scenarios A and B in which the method is carried out.

In both scenarios A and B shown in FIG. 2, a railway vehicle 300, which in FIG. 2 is indicated via a rectangular frame, moves on rails into a direction x which is indicated via an arrow. The railway vehicle 300 in this embodiment exemplarily is realized as a train and comprises an On-board unit, OBU 250 that has an antenna unit 200 and a probe 201 connected to the antenna unit 200. In this embodiment, the probe 201 is adapted to measure an electric field E in the near field of a WTU/balise 100, which in FIG. 2 is exemplarily realized as an Eurobalise. However, the invention is not limited to balises. In fact, the method according to the invention can be carried out for all kinds of transponders and be used for the detection of crosstalk phenomena in the communication with such transponders. Furthermore, the invention can also be carried out using multiple probes adapted to measure electric and/or magnetic fields.

In this embodiment, the probe 201 is placed in a near field region of the WTU 100 keeping a margin with respect to the ground the railway vehicle 300 is riding on. In FIG. 2, the margin is denoted H and exemplarily has a value of 10 cm. However, the distance or margin between the ground and a probe 201 can also differ from the aforementioned value, as long as the probe 201 is arranged in the near field region of the WTU/balise 100 when passing it. The method will be carried out when the OBU 250, and especially the probe 201 connected to the antenna unit 200 of the OBU 250, gets into the range of the WTU 100. In this embodiment, in a first step $S_1$ of the method, the OBU 250 receives an excitation signal of the WTU/balise 100 via the antenna unit 200 in a moving state of the railway vehicle 300. In more detail, the excitation signal is a predefined excitation signal corresponding to a predefined WTU/balise 100. The excitation signal is received via the antenna unit 200 connected to the probe 201 as soon as the probe 201 arrives within a predetermined range of the predefined WTU/balise 100 the OBU 250 whishes to communicate with. The excitation signal is a predefined signal so that it can be distinguished from the excitation signals of other WTUs, balises or line side equipments.

Upon the reception of the predefined excitation signal, a second step $S_2$ of measuring an electric field E in a near field of the WTU/balise 100 via the probe 201 connected to the antenna unit 200 is initiated. Expressed in other words, as soon as the OBU 250 receives the excitation signal, the probe 201 is used to measure the electric field E in a near field of the WTU/balise 100. In general, in the near field of the balise 100, the electric field of the same has a closed loop waveguide pattern which in FIG. 2 is illustrated by arrows arranged in a rectangular shape. In other embodiments of the method, besides the electric field E, also a magnetic field H may be measured. Furthermore, it is also possible to carry out embodiments of the invention in which only a magnetic field H is measured in a near field of a WTU. In this embodiment, the near field of the WTU/balise 100 is measured in real time, using the probe 201 for a predefined interval T which is also referred to as a predefined contact length interval T. The predefined contact length interval T is calculated according to the formula $T=(3*L_{WTU})/(v_{rv,max})$ wherein $L_{WTU}$ in this embodiment is the geometrical length of the balise 100 and wherein $v_{rv,max}$ is the maximum speed limit allowed for the railway vehicle 300. However, the aforementioned formula is a project-specific formula. Thus, any other formula can be used to calculate the predefined contact length interval T.

In FIG. 2, the second step $S_2$ of measuring in both scenarios A (shown above) and B (shown below) is indicated via the predefined contact length interval T. As can be seen in FIG. 2, after the predefined contact length interval T has passed, the OBU 250 with the antenna unit 200 and the probe 201 has moved forward relative to the position of the WTU/balise 100. In FIG. 2, the new position of the OBU 250, the antenna unit 200 and the probe 201—after the predefined contact length interval T has passed—is indicated via dashed frames. In the scenario A shown in FIG. 2, the OBU 250 together with the antenna unit 200 and the probe 201 performs the measurement in the second step $S_2$ of the method while the train is positioned exactly on or above the WTU/balise 100. The electric field measured of the WTU/balise 100 within or during the predefined contact length interval T thus has a closed loop waveguide pattern. Expressed in other words, an electric field E with a closed loop waveguide pattern is measured during the predefined contact length interval T, as the train is directly positioned on the WTU/balise 100 when the measurement is performed.

In the third step $S_3$ of the method, a near field to far field transformation, NF2FFT is performed on the electric field measured in the step of measuring $S_2$ to detect a presence of a crosstalk phenomenon. In the scenario A shown in FIG. 2, the NF2FFT results in an NF2FFT curve with a narrow beam width, wherein the resulting NF2FFT curve is schematically illustrated in FIG. 2. The NF2FFT curve is characteristic for a situation in which a crosstalk phenomenon is not present in the communication between a WTU/balise 100 and an On-board unit 250, and thus characteristic for a situation in which the WTU/balise 100 and its position are detected correctly.

However, this is not the case in scenario B which is also shown in FIG. 2. In scenario B, the WTU/balise 100 is detected too early and thus falsely due to the presence of a crosstalk phenomenon. Expressed in other words, in scenario B, the excitation signal—due to crosstalk—is detected too early, and the WTU/balise 100 is detected before the train and especially before the OBU 250 passes over the WTU/balise 100. Therefore, in the scenario B, the second step $S_2$ of measuring is performed when the train and the OBU 250 are not positioned exactly on the WTU/balise 100. Due to this shift in position, the electric field measured by the probe 201 during the predefined contact length interval T has not a closed loop waveguide pattern, but an open loop waveguide pattern, as the probe 201 measures the electric field E which is arising due to the loops and line cables in the field. When the NF2FFT is performed on the electric field measured in scenario B in the second step $S_2$ of the method, the resulting NF2FFT curve has a broader beam width as the one received in scenario A as described hereinbefore.

In this embodiment, the method further comprises the fourth step $S_4$ of evaluating a pattern of the near field to far field transformation, NF2FFT curve received as a result in the step of performing $S_3$. Furthermore, in this embodiment, the fourth step $S_4$ of evaluating further comprises the sub-step of determining $S_{4-1}$ two parameters of the NF2FFT curve, wherein the parameters in this embodiment exemplarily are the beam width of the NF2FFT curve and the polarization of the NF2FFT curve. However, it is also possible to perform an evaluation of the NF2FFT curve using other parameters of the same, as for example the directivity of the NF2FFT curve, the gain of the NF2FFT curve or any other parameter of the NF2FFT curve suitable for an evaluation. Moreover, in this embodiment, the step of evaluating $S_4$ further comprises the sub-step of comparing $S_{4-2}$ the two determined parameters of the NF2FFT curve to a corresponding reference parameter of a reference NF2FFT curve of a reference WTU.

In the scenarios A and B, the fourth step $S_4$ of evaluating and the sub-steps of determining $S_{4-1}$ the two parameters of the NF2FFT curve and of comparing $S_{4-2}$ the determined parameters of the NF2FFT curve to a corresponding reference parameter of a reference NF2FFT curve of a reference WTU are schematically illustrated. In scenario A, the parameters determined correspond to the parameters expected and calculated or deposited, as the NF2FFT curve of the measured electric field corresponds to the reference NF2FFT curve of the reference WTU, which in FIG. 2 is illustrated as a dotted curve. The two NF2FFT curves substantially have the same beam width and substantially the same polarization. Thus, a crosstalk phenomenon is not detected in scenario A.

In scenario B, the parameters determined do not correspond to the parameters expected and calculated or deposited, as the NF2FFT curve of the measured electric field does not correspond to the reference NF2FFT curve of the reference WTU. In more detail, the NF2FFT curve received as a result in the third step $S_3$ of performing and the reference NF2FFT curve have different beam widths and—at least in some fractions of the predefined contact length interval T—a different polarization which will be described in greater detail with respect to FIGS. 3 and 4 further below. Thus, in scenario B, the presence of a crosstalk phenomenon is detected.

Expressed once more in other words, the problem of crosstalk as illustrated in FIG. 1 and as described hereinbefore is solved by the use of a probe 201 and by the performance of a near field to far field transformation, NF2FFT. The NF2FFT is used to provide for a proof whether a crosstalk phenomenon is present while reading a WTU/balise 100. The near fields of the line side equipments—e.g. of different balises and WTUs the train passes when driving along the rails—are measured in real time using a probe 201 for a particular contact length interval T. The process/method starts as soon as the antenna device 200 of the On-board unit 250 receives an excitation signal from the wayside WTU/balise 100. The contact length interval T is a project dependent parameter, which is defined as follows: $T=(3*L_{WTU})/(v_{rv,max})$, wherein $L_{WTU}$ in this embodiment is the length of the balise 100 and wherein $v_{rv,max}$ is the maximum speed limit allowed.

The probe 201 is placed in the near field region keeping a margin with respect to the ground. Via the probe 201, the E field, and in other embodiments also the H field in the near field is measured over the contact length interval T when the WTU/balise 100 is activated. As the train moves in a particular direction, the field is measured in intervals.

The NF2FF transformation curve will yield a pattern which is formed due to the electric (and magnetic) field radiated from the WTU/balise 100. When the train is exactly on the WTU/balise 100, an electric field is measured on the near field of the WTU/balise 100, where the current is forming a closed loop and hence it can be measured a field with a closed loop waveguide pattern. After the NF2FFT has been performed on the field with the closed loop waveguide pattern, the result will have a narrow beam width pattern.

In scenario B of FIG. 2, a situation is shown in which crosstalk is given and in which the WTU/balise 100 is detected falsely before the railway vehicle 300 has passed over the WTU/balise 100. In such a situation, the probe 201, which functions as a near field scanner, would measure the electric field that is arising due to the loops and line cables. Therefore, the electric field measured in scenario B has an open loop waveguide pattern in the contact length interval T, giving rise to a broader beam width after the NF2FF transformation is performed on the field measured with the probe 201.

The near field measured with the probe 201 is transformed to the far field to determine parameters which in this embodiment are the beam width and the polarization of the NF2FFT curve. In other embodiments, other parameters may be determined, as e.g. the directivity and/or the gain of the NF2FFT curve. For the NF2FFT, any transformation method can be chosen, for example a Fourier transformation. The evaluation or correlation to determine whether the WTU/balise 100 is present on the line or not can be performed by comparing it to a standard far field limit set for the respective WTU/balise 100 as described hereinbefore. Due to the distinct resonant frequency and dimension over the contact length interval T, the WTU/balise 100 has a contrasting far field in comparison to other equipments (see FIG. 3). Thus, at the end of the contact length interval T—when the measurement has been carried out—it is possible to detect the presence of a WTU/balise 100 accurately from its NF2FFT pattern.

Figure 3:
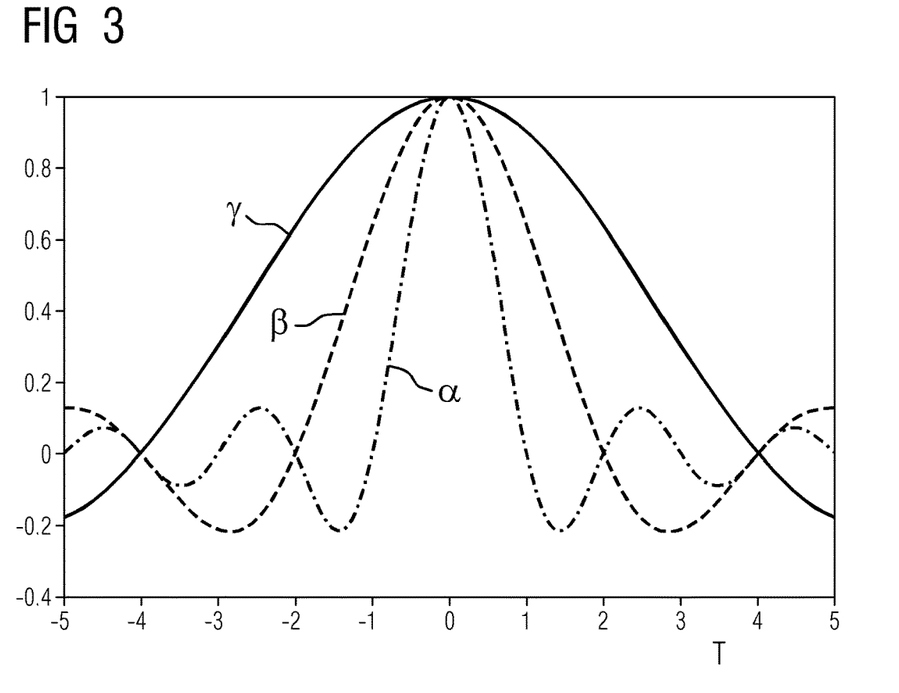
FIG. 3 illustrates different NF2FFT curves of different WTUs, balises and/or line side equipments.

In FIG. 3, different NF2FFT curves of different WTUs are illustrated. In more detail, FIG. 3 illustrates three different NF2FFT curves α, β, γ for electric fields measured of different WTUs, balises and/or line side equipments 100, wherein the gain is plotted against the ordinate of the diagram shown in FIG. 3 and wherein the predefined contact length interval T is plotted against the abscissa of the diagram shown in FIG. 3.

Expressed in other words, FIG. 3 shows that the electric and magnetic fields measured of different WTUs, balises and line side equipments have different NF2FFT curves when transformed to a far field. Thus, in the step of evaluating of a method that is according to the invention, it is possible to differentiate the presence of e.g. an Eurobalise from the presence of other WTUs, balises or line side equipments in the near field measurement performed during the predefined contact length interval T. In an ideal scenario, the WTU, balise or line side equipment with the smallest geometrical dimension provides for the thinnest beam width in the far field, which in FIG. 3 is the NF2FFT curve denoted α. As already mentioned hereinbefore, in the fourth step $S_4$ of evaluating of the embodiment of the method as illustrated in FIG. 2 and as described hereinbefore, the beam width and the polarization of the NF2FFT curves are compared with a reference NF2FFT curve of a reference WTU. However, in other embodiments, also a correlation function can come to use within the fourth step $S_4$ of evaluating, allowing for the detection of the presence of for example a particular WTU or balise.

Figure 4:
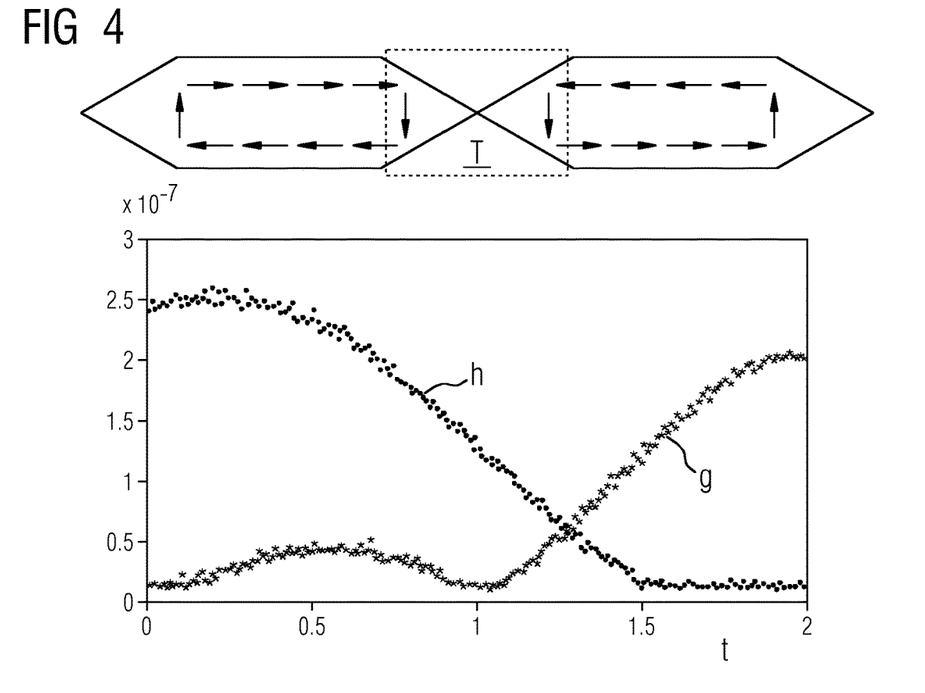
FIG. 4 illustrates the change in polarization in the NF2FFT curve of an electric field of a balise during the predefined contact length interval T.

Furthermore, also the polarity of the NF2FFT curves differs depending on the time of measurement with respect to the predefined contact length interval T, especially when looking onto the joint S-loop-shaped sections of the curves where the polarity alters the most due to the phase change of current distribution of the electric field which can be detected over the predefined contact length interval T as shown in FIG. 4.

In more detail, FIG. 4 illustrates the change in polarization in the NF2FFT curve of an electric field of a balise during the predefined contact length interval T. In FIG. 4, the arrows indicate the electric field of a balise in the near field, wherein the long sides of the rectangular frame shown in FIG. 4 represent the predefined contact length interval T. The diagram below the rectangular frame shows the amplitude of the polarization components of the NF2FFT curve corresponding to the aforementioned electric field. In more detail, the diagram shows the amplitude of the horizontal polarization components g and the amplitude of the vertical polarization components h of the aforementioned NF2FFT curve over time t in seconds.

Figure 5:
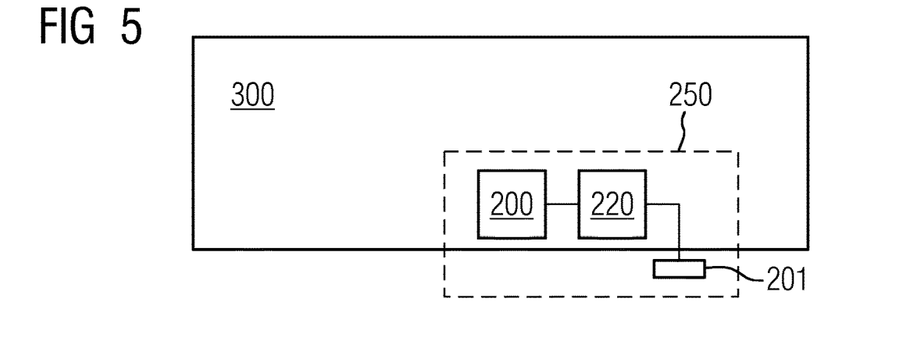
FIG. 5 illustrates an On-board unit according to a first embodiment of the invention.

In FIG. 5, it is illustrated an On-board unit 250 according to a first embodiment of the invention. The On-board unit 250 is realized within a railway vehicle 300, which in this embodiment is exemplarily realized as a train. The On-board unit 250 in this embodiment exemplarily comprises an antenna unit 200, a n×m field-programmable gate array, FPGA 220 and a probe 201 which is arranged outside of the railway vehicle 300 but nevertheless on board of the same. The probe 201 is electrically connected to the FPGA 220 which is electrically connected to the antenna unit 200. In this embodiment, the probe 201 is electrically connected to the center of the FPGA 220 adapted to measure electric and magnetic fields in the near field of a WTU in a linear dimension. The On-board unit 250 is adapted to perform the method according to the invention as described hereinbefore.

Figure 6:
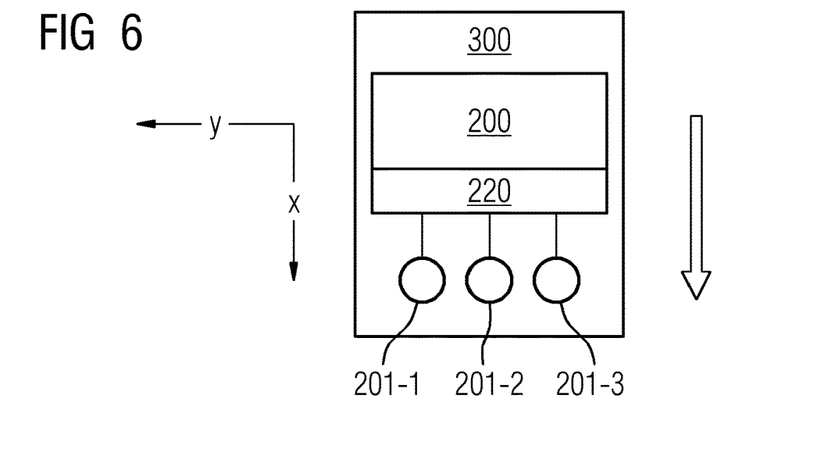
FIG. 6 illustrates an On-board unit according to a second embodiment of the invention.

In FIG. 6, it is illustrated an On-board unit 250 according to a second embodiment of the invention. In this embodiment, the OBU 250 is arranged within a train head of a train 300 which is moving along a direction which is indicated via an arrow. Also in this second embodiment, the OBU 250 comprises an antenna unit 200 and a FPGA 220 electrically connected to the antenna unit 200. In contrary to the first embodiment, the OBU 250 of the second embodiment comprises a plurality of probes 201 that are electrically connected to the FPGA 220, wherein three probes 201-1, 201-2, 201-3 of the plurality of probes 201 are shown in FIG. 6. Furthermore, for the sake of a better orientation, a coordinate system is shown in FIG. 6. A x-direction of the coordinate system is arranged in parallel to the moving direction of the train 300, wherein a y-direction of the coordinate system is arranged perpendicular to the moving direction of the train 300.

In this second embodiment, the probes 201 are arranged along a direction that is parallel to the y-direction of the coordinate system. Via the multiple probes, electric and magnetic fields can be measured in a two dimensional array. The measurement via the probes is performed throughout the aforementioned predefined contact length interval T in every λ/12 interval, wherein λ corresponds to the wavelength of the balise and can be scanned via the probes 201 of the On-board unit 250. In other embodiments, the measurement via the probes can also be performed throughout any other predefined contact length interval T and in any other interval, for example in every λ/100, λ/200 or λ/300 interval. The aforementioned λ/X-interval can also be a project specific parameter. In this embodiment, the distance between probes 201 is measured and given as an input parameter for the NF2FFT. Similarly, in this embodiment, the FPGA 220 is adapted to measure the near field in every λ/X distance, e.g. in every λ/300 distance. Furthermore, in this embodiment, the scan array has two different scanning widths and is optimized to get the best performance.

Figure 7:
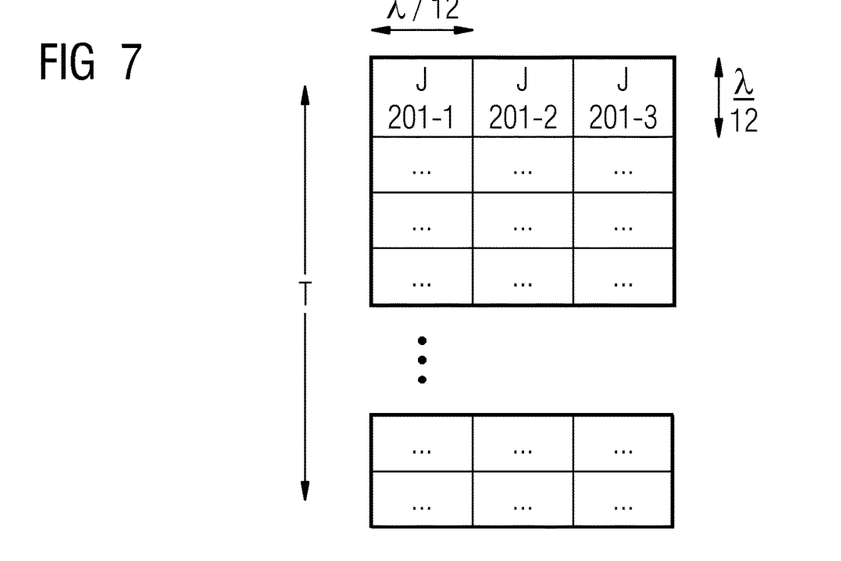
FIG. 7 illustrates the rectangular scan surface of the On-board unit according to the second embodiment of the invention.

With such an On-board unit 250 comprising multiple probes 201, it is possible to scan a plain rectangular scan surface, wherein in every λ/12 interval, an electric and/or magnetic field is measured and stored in a matrix as shown in FIG. 7. In FIG. 7, the measurements of the electric and/or magnetic fields $J_{201-1}$, $J_{201-2}$, $J_{201-3}$ performed by the corresponding probes 201-1, 201-2, 201-3 are stored within the columns and rows of the matrix. If n×m near field samples are gathered, the far field can be calculated according to the equation:

$$A(k_x, k_y) = \frac{1}{n}\sum_{i=1}^{n}\sum_{k=1}^{m} E_{i,k}(x, y, 0)e^{-jk_x x_i}e^{-jk_y y_k},$$

wherein A is the vector amplitude of the electric field E, $k_x$ is the propagation constant of the electric field E along a x-direction and wherein $k_y$ is the propagation constant of the electric field E along a y-direction. From this equation, all the far field parameters can be determined, as e.g. the directivity, gain, beam width and polarization of the NF2FFT.

Moreover, for example an Eurobalise has a predefined center frequency and a loop antenna arranged inside which provide for a unique far field pattern with respect to its transducer length. Therefore, the diameter of the loop antenna or the dimensions of other trackside elements have different antenna dimensions and hence different radiation characteristics.

REFERENCE SIGNS

100 Wayside transmission unit, WTU, balise
170 Inaccurate position
200 Antenna unit
201, 201-1, 201-2, 201-3 Probe
220 Field-programmable gate array, FPGA
250 On-board Unit, OBU
300 Railway vehicle, train
h Vertical polarization components
g Horizontal polarization components
α, β, γ Different NF2FFT curves
$J_{201-1}$, $J_{201-2}$, $J_{201-3}$ Measurements of the electric and/or magnetic fields
$S_1$ Step of receiving
$S_2$ Step of measuring
$S_3$ Step of performing
$S_4$ Step of evaluating
$S_{4-1}$ Sub-step of determining
$S_{4-2}$ Sub-step of comparing

The invention claimed is:

1. A method for the detection of a crosstalk phenomenon in the communication between a wayside transmission unit or balise and an on-board unit of a railway vehicle, the on-board unit including an antenna unit, the method comprising the following steps:
   using the antenna unit to receive an excitation signal of the wayside transmission unit in a moving state of the railway vehicle;
   using the antenna unit to measure at least one of an electric or magnetic field in a near field of the wayside transmission unit upon reception of the excitation signal; and
   performing a near field to far field transformation on the field measured in the measuring step to detect a presence of a crosstalk phenomenon.

2. The method according to claim 1, which further comprises providing the on-board unit with at least one probe connected to the antenna unit and, during the measuring step, measuring the near field of the wayside transmission unit in real time by using the at least one probe for at least one predefined interval.

3. The method according to claim 2, which further comprises calculating the at least one predefined interval according to a formula $T=(3*Lw_T u)/(v_{rv,max})$, wherein:
   $L_{WTU}$ is a geometrical length of the wayside transmission unit, and
   $v_{rv,max}$ is a maximum speed limit allowed for the railway vehicle.

4. The method according to claim 2, which further comprises measuring the at least one of electric or magnetic field in the near field of the wayside transmission unit throughout the predefined interval in the measuring step.

5. The method according to claim 2, which further comprises providing the on-board unit with an n×m field-programmable gate array connected to the at least one probe and allowing for a measurement of n×m near field samples within the measuring step.

6. The method according to claim 1, which further comprises evaluating a pattern of a near field to far field transformation curve received as a result of the performing step.

7. The method according to claim 6, which further comprises determining at least one parameter of the near field to far field transformation curve in the evaluating step, and choosing the at least one parameter from a group of parameters including:
   a beam width of the near field to far field transformation curve,
   a polarization of the near field to far field transformation curve, a directivity of the near field to far field transformation curve, and a gain of the near field to far field transformation curve.

8. The method according to claim 7, which further comprises performing the evaluating step by carrying out a sub-step of comparing the at least one determined parameter of the near field to far field transformation curve to a corresponding reference parameter of a reference near field to far field transformation curve of a reference wayside transmission unit.

9. The method according to claim 8, which further comprises outputting an indication signal indicating a presence of a crosstalk phenomenon within the communication between the wayside transmission unit and the on-board unit as soon as an absolute value of a difference between the at least one determined parameter of the near field to far field transformation curve and the corresponding reference parameter of the reference near field to far field transformation curve of the reference wayside transmission unit exceeds a predefined value.

10. The method according to claim 1, which further comprises, within the performing step, calculating a far field according to an equation:

$$A(k_x, k_y) = \frac{1}{n}\sum_{i=1}^{n}\sum_{k=1}^{m} E_{i,k}(x, y, 0)e^{-jk_x x_i}e^{-jk_y y_k},$$

wherein:
A is a vector amplitude of the electric field,
$k_x$ is a propagation constant of the electric field along an x-direction, and
$k_y$ is a propagation constant of the electric field along a y-direction.

11. An on-board unit of a railway vehicle, the on-board unit OBU comprising:

an antenna unit;
the on-board unit being adapted to:
use said antenna unit to receive an excitation signal of a wayside transmission unit in a moving state of the railway vehicle;
use said antenna unit to measure at least one of an electric or magnetic field in a near field of the wayside transmission unit upon reception of the excitation signal; and
perform a near field to far field transformation on the field measured in the measuring step to detect a presence of a crosstalk phenomenon.

12. The on-board unit according to claim 11, which further comprises an n×m-field-programmable gate array.

13. The on-board unit according to claim 12, which further comprises:
a probe electrically connected to said n×m-field-programmable gate array;
the on-board unit being adapted to measure at least one of an electric or magnetic field in a near field of the wayside transmission unit in a linear dimension by using said n×m-field-programmable gate array and said probe.

14. The on-board unit according to claim 12, which further comprises:
at least two probes electrically connected to said n×m-field-programmable gate array;
the on-board unit being adapted to measure at least one of an electric or magnetic field in a near field of the wayside transmission unit in a two dimensional array by using said n×m-field-programmable gate array and said at least two probes.

15. The on-board unit according to claim 14, wherein said at least two probes are disposed along a direction perpendicular to a driving direction of the railway vehicle.

* * * * *